(12) United States Patent
Eberhardt

(10) Patent No.: US 9,718,301 B2
(45) Date of Patent: Aug. 1, 2017

(54) DRIPLESS PAINT CAN AND PAINT CAN LID

(71) Applicant: Phil Eberhardt, East Quogue, NY (US)

(72) Inventor: Phil Eberhardt, East Quogue, NY (US)

( * ) Notice: Subject to any disclaimer, the term of this patent is extended or adjusted under 35 U.S.C. 154(b) by 0 days.

(21) Appl. No.: 14/319,719

(22) Filed: Jun. 30, 2014

(65) Prior Publication Data
US 2015/0001252 A1  Jan. 1, 2015

Related U.S. Application Data

(60) Provisional application No. 61/840,953, filed on Jun. 28, 2013.

(51) Int. Cl.
*B44D 3/12* (2006.01)
*B32B 27/32* (2006.01)

(52) U.S. Cl.
CPC .............. *B44D 3/127* (2013.01); *B32B 27/32* (2013.01); *B44D 3/128* (2013.01); *B32B 2439/00* (2013.01)

(58) Field of Classification Search
CPC .... B44D 3/127; B44D 3/128; B32B 2439/00; B65D 43/022; B65D 43/0216
USPC .................. 222/109, 570; 220/698, 797, 798
See application file for complete search history.

(56) References Cited

U.S. PATENT DOCUMENTS

| | | | | |
|---|---|---|---|---|
| 2,084,084 A | * | 6/1937 | Greer | B65D 43/0216 109/58 |
| 2,709,022 A | * | 5/1955 | Fatke | B44D 3/128 220/325 |
| 2,885,108 A | * | 5/1959 | Donoghue | B44D 3/128 220/378 |
| 4,928,846 A | * | 5/1990 | Murrin, Jr. | B44D 3/127 220/733 |
| 6,189,725 B1 | | 2/2001 | Monico | |
| 6,311,862 B1 | | 11/2001 | Barnes | |
| 6,609,629 B2 | | 8/2003 | Lucey | |
| 7,121,425 B2 | | 10/2006 | Shanabrook | |
| 2002/0030058 A1 | | 3/2002 | Bothwell | |

* cited by examiner

*Primary Examiner* — Paul R Durand
*Assistant Examiner* — Robert Nichols, II
(74) *Attorney, Agent, or Firm* — Global Intellectual Property Agency, LLC; Daniel Boudwin

(57) ABSTRACT

Disclosed is a dripless paint can and paint can lid. The device includes a cylindrical paint can having an inner rim disposed along the top end thereof. The inner rim includes a plurality of apertures separated at regular intervals. The apertures are adapted to drain excess paint that sits on the inner rim into the interior of the paint can. The paint can may further include a pivotally attached handle thereon to facilitate the transportation of paint. The present invention further includes a paint can lid having a plurality of protruding members thereon. The protruding members are also separated at regular intervals and can be directly aligned to the apertures on the inner rim of the paint can so that each of the protruding members can be inserted into an aperture. The protruding members lock within the apertures, thereby improving the seal between the paint can and paint can lid.

11 Claims, 2 Drawing Sheets

DRIPLESS PAINT CAN AND PAINT CAN LID

CROSS REFERENCE TO RELATED APPLICATION

This application claims the benefit of U.S. Provisional Application No. 61/840,953 filed on Jun. 28, 2013. The above identified patent application is herein incorporated by reference in its entirety to provide continuity of disclosure.

BACKGROUND OF THE INVENTION

Field of the Invention

The present invention relates to a paint can and a paint can lid. More specifically, the present invention pertains to an improved dripless paint can having an inner rim with a plurality of apertures thereon. The apertures are adapted to drain any residual paint that is collected in the inner rim. The paint can lid comprises a plurality of protruding members that are adapted to insert into the apertures, thereby providing an airtight seal.

Many painters utilize paint cans to transport and store paint. When utilizing paint directly out of the can, painters wipe excess paint from a brush on the rim of the can. Alternatively, paint is poured out of the can to a paint roller tray when using a paint roller to paint larger surfaces. During use, conventional paint cans tend to collect excess paint in the rim or drip excess paint therefrom. This can be frustrating and messy, as painters are required to constantly clean or wipe off the excess paint. Additionally, paint drips can waste paint needed to complete a painting project.

Excess paint can also dry in the rim of the paint can, which can prevent the lid from properly sealing the paint can. When the paint can lid cannot fully close the paint can, the remaining paint can form a film and dry out. Dried paint changes the quality of the paint, causing the paint to differ in color and texture from the original paint. As such, dried paint may not be suitable for use and should be discarded. Therefore, failing to properly seal the paint can waste more paint and prevent the painter from using the paint at a later time for touch ups and the like.

The present invention relates to a dripless paint can and a paint can lid. The paint can provides apertures along the perimeter of the inner rim. The apertures allow the excess paint in the rim to drip into the can. In this way, the apertures prevent excess paint from drying along the edges of the paint can. The primary advantage of the present invention, is not only the construction of the apertures, but more specifically the paint can lid associated with the paint can of the present invention. The paint can lid comprises a plurality of protruding members that correspond to the apertures on the paint can so that the lid can be removably secured onto the can. Furthermore, the protruding members help push any residual paint through the apertures.

Description of the Prior Art

Devices have been disclosed in the prior art that claim dripless paint cans. These include devices that have been patented and published in patent application publications. The prior art devices generally include paint cans with apertures in the rim that enable paint that sits on the rim to drain back into the interior of the can. These devices, however, do not disclose a paint can lid with protruding members for securing the lid onto the paint can. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,189,725 to Monico discloses a paint can with rim drainage apertures. The paint can comprises an annular lip along the upper perimeter of the can. The annular lip includes an annular groove formed in the top surface thereof, and a plurality of apertures disposed at regular intervals. The apertures allow paint in the annular lip to drip into the interior space of the paint can. While the Monico device allows residual paint in the lip of the paint can to drip back into the interior space of the paint can, the Monico device fails to disclose a paint can lid that provides an airtight seal. The present invention discloses a paint can and a paint can lid, wherein the paint can lid comprises a plurality of protruding members that engage the apertures disposed on the inner rim of the can. In this way, the lid removably secures to the can, preserving the remaining paint contained therein.

Similarly, U.S. Published Patent Application Number 2002/0030058 to Bothwell discloses a dripless paint can comprising perforated drip holes in the inner trough of the paint can ring. The paint can ring is adapted to receive a paint can lid thereon. It is contemplated that the lid comprises a conventional paint can lid that is disc-like in shape and includes an annular groove about the perimeter of the lid. As such, the Bothwell device does not disclose a paint can lid having a plurality of protruding members disposed around the perimeter of the lid. The present paint can lid comprises a plurality of protruding members that is adapted to engage the apertures disposed on the inner rim of the paint can. In this way, the lid can securely lock onto the can.

U.S. Pat. No. 6,609,629 to Lucey discloses a dripless paint bucket comprising an upper perimeter. The upper perimeter of the bucket comprises a handle and elongated apertures therearound. The apertures are positioned to open into a continuous, circumferential gutter that is located along the upper perimeter of the bucket. While the Lucey device provides drainage for paint that spills into the gutter, the purpose and design of the Lucey device differ from the present invention in that the Lucey device is not designed to preserve any remaining paint in the bucket. Instead, Lucey provides a container used to transport paint. In contrast, the present invention allows a user to transport paint as well as preserving the remaining paint contained therein for later use. Thus, the present invention is designed to increase the versatility of a paint can by providing one that can be utilized to transport paint, and further one that stores paint for later use.

U.S. Pat. No. 6,311,862 to Barnes discloses a dripless paint can that comprises an inwardly extending rim portion containing at least one spaced opening thereon. The openings are located along one side of the rim so that the other side of the rim can be used for pouring without paint being spilled through the openings. Conversely, the paint can of the present invention comprises apertures along both sides of the inner rim. The apertures are adapted to allow a steady flow of paint so that the paint does not spill or leak. As such, the present invention provides flexibility to the user by allowing the user to tip the can at various angles when pouring.

Finally, U.S. Pat. No. 7,121,425 to Shanabrook discloses a paint can with drain holes and a tool for forming the drain holes. The tool comprises two pivotally attached rim engagement members that are engaged via handles. The rim engagement members are adapted to pierce a drain hole along the inner rim of an existing paint can. As such, the device of Shanabrook requires a user to create one or more drain holes on the inner rim of the can in order to prevent the can from dripping paint. Unlike the Shanabrook device, the present invention comprises a paint can with pre-existing apertures and a paint can lid having a plurality of protruding members thereon. The apertures and the protruding members are constructed to align with each other to create an airtight seal when the lid is placed over the can.

The devices disclosed in the prior art have several known drawbacks. These devices are limited in that they do not provide a paint can lid for providing an airtight seal to preserve and store any paint contained in the paint can. The present invention overcomes these limitations by disclosing a paint can lid that comprises a plurality of protruding members that engage the apertures disposed on the inner rim of the can. It is therefore submitted that the present invention is substantially divergent in design elements from the prior art, and consequently it is clear that there is a need in the art for an improvement to dripless paint cans. In this regard, the instant invention substantially fulfills these needs.

SUMMARY OF THE INVENTION

In view of the foregoing disadvantages inherent in the known types of dripless paint cans now present in the prior art, the present invention provides a new and improved dripless paint can and paint can lid wherein the same can be utilized for preventing excess paint drips and for storing paint.

It is therefore an object of the invention to provide a new and improved dripless paint can and paint can lid that has all of the advantages of the prior art and none of the disadvantages.

Another object of the present invention is to provide a new and improved dripless paint can having a plurality of apertures along the perimeter of the inner rim.

Yet another object of the present invention is to provide a new and improved paint can lid having a plurality of protruding members.

Still yet another object of the present invention is to provide a new and improved dripless paint can and paint can lid that prevents excess paint from dripping out of the can.

Still yet another object of the present invention is to provide a new and improved paint can lid that provides an airtight seal when placed over a paint can.

Still yet another object of the present invention is to provide a new and improved dripless paint can and paint can lid that preserve remaining paint for later use.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
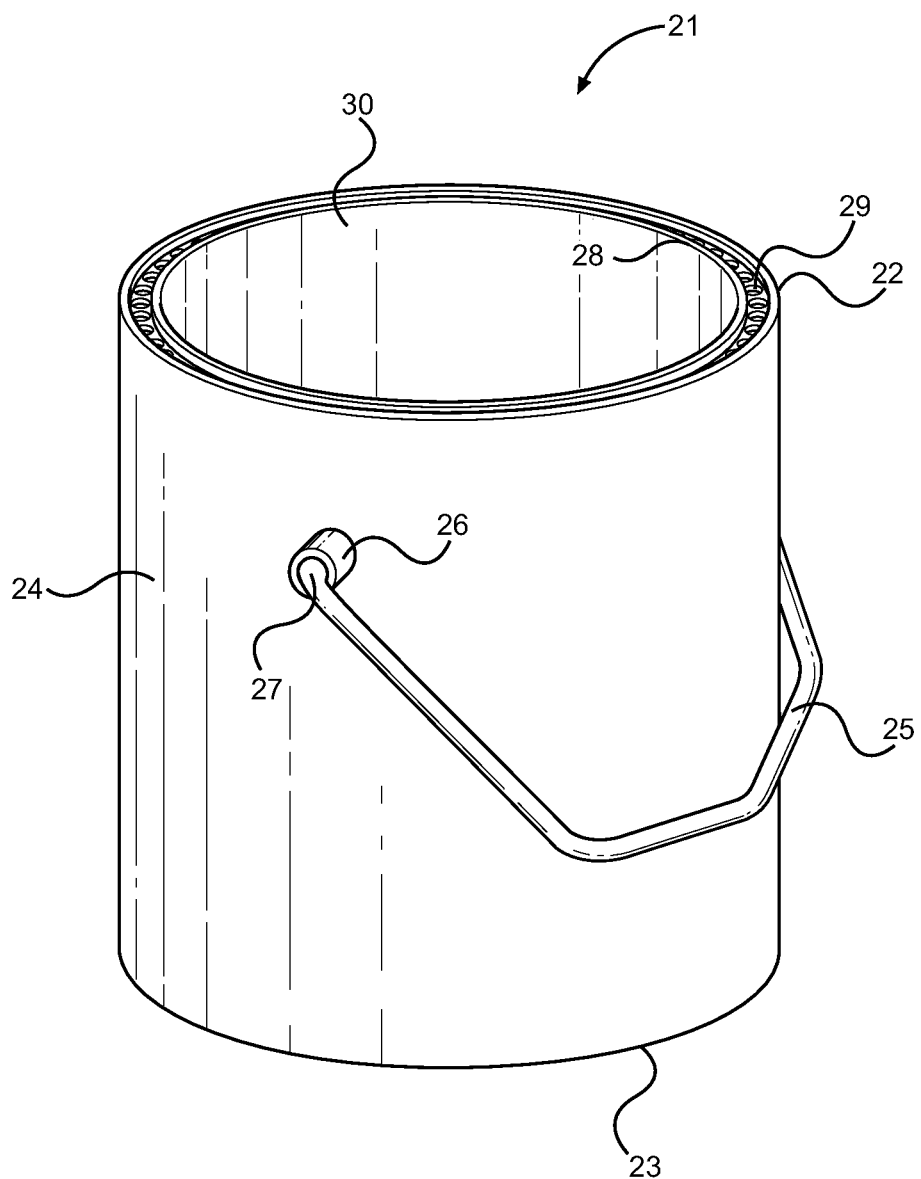
FIG. 1 shows a perspective view of the paint can of the present invention.

References are made herein to the attached drawings. Like reference numerals are used throughout the drawings to depict like or similar elements of the dripless paint can and paint can lid. For the purposes of presenting a brief and clear description of the present invention, the preferred embodiment will be discussed as used to prevent excess paint drips and to store paint. The figures are intended for representative purposes only and should not be considered to be limiting in any respect.

Referring now to FIG. 1, there is shown a perspective view of the paint can 21 of the present invention. The present paint can 21 may be composed of metal or other suitable material. The can 21 comprises an open top end 22, a closed bottom end 23, and an upstanding wall 24 extending vertically therebetween, forming a hollow interior 30 for holding paint therein. The can 21 is substantially cylindrical in shape and has a circular cross section with a diameter that is uniform over its height.

The upstanding wall 24 comprises an interior surface that is coextensive with an exterior surface. The interior surface of the upstanding wall 24 comprises an annular inner rim 28 near the top end 22 and along the perimeter thereof. The inner rim 28 includes an outer perimeter and an inner perimeter, wherein the outer perimeter is connected to the interior surface of the upstanding wall 24 and the inner perimeter comprises a terminal edge. The inner rim 28 extends inwardly and perpendicularly relative to the plane of the upstanding wall 24. In some embodiments, the inner rim 28 may further comprise an annular channel disposed between the inner and outer perimeter of the inner rim. The inner rim 28 further includes a plurality of apertures 29 disposed between the inner and outer perimeter thereof. The apertures 29 are preferably circular in shape and are separated at regular intervals along the inner rim 28. The apertures 29 are adapted to drain excess paint left on the inner rim 28 into the hollow interior 30 of the paint can 21.

The exterior surface of the upstanding wall 24 comprises a handle assembly to facilitate the carrying of the paint can 21. The handle assembly comprises a handle 25 having terminal ends 27. The handle 25 may be composed of metal or other suitable rigid material. The handle 25 is elongated and may have a circular cross section. The handle 25 is preferably bent at or near its substantial midpoint so that each of the terminal ends 27 may be placed at opposing sides of the upstanding wall 24. Each of the terminal ends 27 are pivotally connected to a handle mount 26 on opposing sides of the upstanding wall 24 so that the handle 25 can freely rotate about the handle mount 26. The handle mount 26 may be a cylindrical structure having a hollow middle portion or an aperture for receiving the terminal ends 27 therein. The terminal ends 27 of the handle 25 may be biased toward the handle mounts 26 so that the terminal ends 27 of the handle may be retained in the hollow middle portion of the handle mounts 26 without using fasteners.

Figure 2:
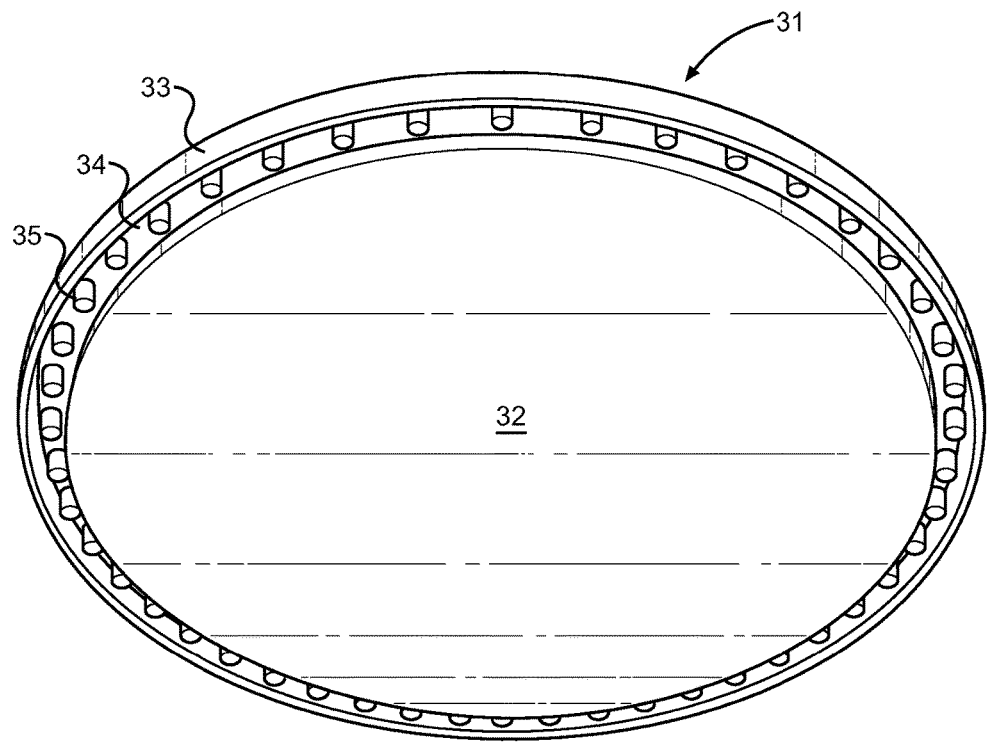
FIG. 2 shows a bottom perspective view of the paint can lid of the present invention.

Referring now to FIG. 2, there is shown a bottom perspective view of the paint can lid 31 of the present invention. The paint can lid 31 may be composed of plastic, rubber, silicone, or other suitable material that is resilient in nature. The paint can lid 31 is circular in shape and has a diameter that is substantially equal to the diameter of the paint can 21. The lid 31 comprises an upper surface and a lower surface 32, forming a defined perimeter. The perimeter of the paint can lid 31 comprises a lip 33 that extends vertically downward therefrom. The lid 31 further comprises an annular channel 34 that spans between the lip 33 and the lower surface 32. It is preferred that the annular channel 34 comprises a width that is equal to the distance between the inner and outer perimeter of the inner rim of the paint can.

The annular channel 34 further comprises a plurality of protruding members 35 that extend downward therefrom. The protruding members 35 are preferably cylindrical in shape with a circular cross section having a diameter. The diameter of each of the protruding members 25 is substantially equal to, or slightly less than the diameter of the apertures disposed on the inner rim of the paint can. In this way, the protruding members 35 are dimensioned to fit into the apertures. Additionally, the protruding members 35 are spaced apart at regular intervals so as to align with the apertures disposed on the inner rim of the paint can. In a preferred embodiment, the protruding members 35 and the lid 31 are unitary in structure. The protruding members 35 may be constructed from injection molding, trimming, presses, and the like.

Figure 3:
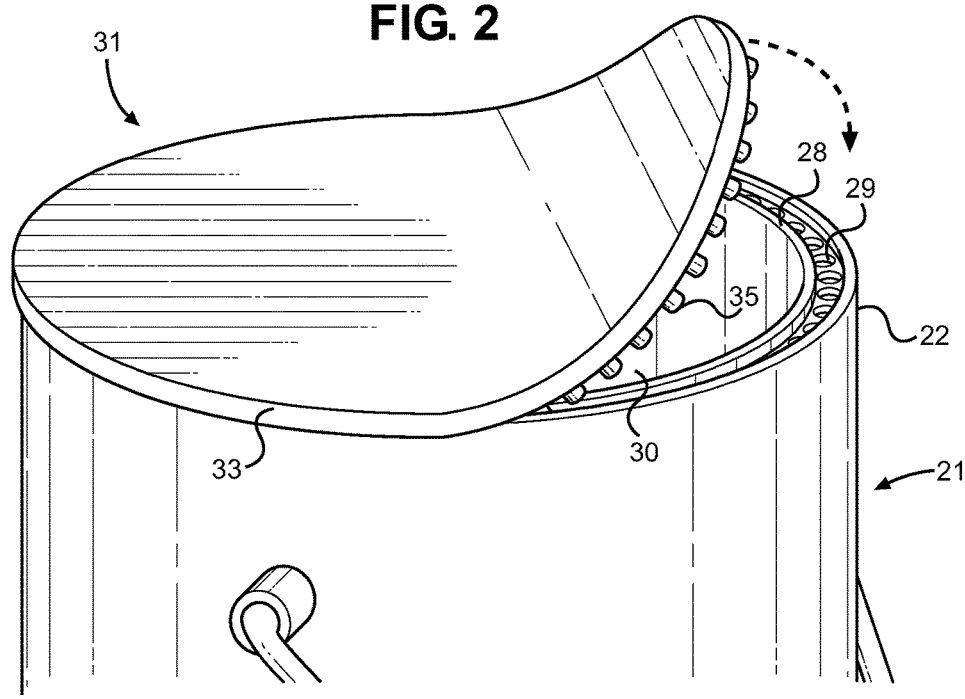
FIG. 3 shows a view of the paint can lid as being placed onto the paint can of the present invention.

Referring now to FIG. 3, there is shown a view of the paint can lid 31 as being placed onto the top end 22 of the paint can 21 of the present invention. The lid 31 is dimensioned to completely cover the top end 22 of the paint can 21. As such, the diameter of the lid 31 is substantially equal to the diameter of the cross section of the paint can 21. It is preferred that each of the protruding members 35 is aligned with an aperture 29 on the inner rim 28. Thereafter, each of the protruding members 35 is inserted through an aperture 29. When the protruding members 35 are inserted through the apertures 29, the protruding members 35 push residual paint on the rim 28 through the apertures 29. Additionally, the lid 31 remains securely locked to the paint can 21 when the protruding members 35 and the apertures 29 are engaged.

Because the paint can lid 31 is composed of resilient material such as plastic, rubber, or silicone, the lid 31 is adapted to fit snugly onto the top end 22 of the paint can 21. Additionally, the lip 33 of the paint can lid 31 is adapted to create a seal around the periphery of the exterior surface of the upstanding wall. In this way, the lid 31 prevents paint in the interior 30 of the paint can 21 from exposure to dust, debris, humidity, and other elements. Storing paint in an airtight paint can allows for a prolonged shelf life of the paint so that the user may utilize the remaining paint for touch ups and other painting projects.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dripless paint can and paint can lid, comprising:
   a cylindrical paint can having an open top end, a closed bottom end, and an upstanding wall vertically extending between said top end and said bottom end;
   an annular rim connected to said top end;
   said annular rim including an inner perimeter and an outer perimeter defining an annular channel therebetween; the annular channel having a plurality of apertures separated at regular intervals;
   a circular lid configured to removably attach to the top end of the paint can, the circular lid having a lower surface, a perimeter defining a lip, and an annular channel disposed between the lower surface and the lip;
   said annular channel of said lid comprising a plurality of protruding members spaced apart at regular intervals;
   wherein the protruding members have a uniform width along their length;
   wherein the width of the protruding members is equal to a close tolerance to a width of the plurality of apertures; and
   wherein the plurality of protruding members are fixed in positioned relative to the lid;
   wherein the protruding members are configured to engage the plurality of apertures and the lip is configured to engage the outer perimeter so as to securely fasten the lid around the top end of the paint can.

2. The dripless paint can and paint can lid of claim 1, wherein said plurality of apertures are circular in shape.

3. The dripless paint can and paint can lid of claim 1, wherein said plurality of protruding members are cylindrical in shape.

4. The dripless paint can and paint can lid of claim 1, wherein said upstanding wall comprises:
   a first handle mount and a second handle mount;
   each of said first handle mount and said second handle mount having an aperture thereon;
   a handle having a first terminal end and a second terminal end;
   said first terminal end of said handle pivotally attached to said first handle mount;
   said second terminal end of said handle pivotally attached to said second handle mount.

5. The dripless paint can and paint can lid of claim 1, wherein said annular rim extends inward and perpendicularly to a plane of said upstanding wall.

6. The dripless paint can and paint can lid of claim 1, wherein the lip extends perpendicularly and vertically relative to the lower surface of the lid, such that the lip is parallel to the protruding members.

7. The dripless paint can and paint can lid of claim 1, wherein a distance between each of said plurality of apertures is substantially equal to a distance between each of said plurality of protruding members.

8. The dripless paint can and paint can lid of claim 1, wherein said perimeter of said lid is substantially equal to a perimeter of said upstanding wall of said paint can.

9. The dripless paint can and paint lid of claim 1, wherein the protruding members and the paint can lid are unitary in structure.

10. The dripless paint can and paint lid of claim 1, wherein the annular channel of the lid is equal to a distance between the inner perimeter and outer perimeter of the annular rim of the cylindrical paint can.

11. The dripless paint can and paint lid of claim 1, wherein the circular lid is composed of a flexible material.

* * * * *